United States Patent
Kotsuji

(10) Patent No.: US 11,667,226 B2
(45) Date of Patent: Jun. 6, 2023

(54) BEVERAGE CONTAINER HOLDING DEVICE

(71) Applicant: MORIROKU TECHNOLOGY COMPANY, LTD., Tokyo (JP)

(72) Inventor: Yusuke Kotsuji, Tokyo (JP)

(73) Assignee: MORIROKU TECHNOLOGY COMPANY, LTD., Tokyo (JP)

( * ) Notice: Subject to any disclaimer, the term of this patent is extended or adjusted under 35 U.S.C. 154(b) by 0 days.

(21) Appl. No.: 17/969,899

(22) Filed: Oct. 20, 2022

(65) Prior Publication Data

US 2023/0044201 A1 Feb. 9, 2023

Related U.S. Application Data

(62) Division of application No. 17/226,449, filed on Apr. 9, 2021, now Pat. No. 11,505,106, which is a division of application No. 16/985,569, filed on Aug. 5, 2020, now Pat. No. 11,001,184.

(30) Foreign Application Priority Data

Aug. 19, 2019 (JP) .................... 2019-149893

(51) Int. Cl.
  *B60N 3/10* (2006.01)
  *A47G 23/02* (2006.01)

(52) U.S. Cl.
  CPC ......... *B60N 3/108* (2013.01); *A47G 23/0216* (2013.01)

(58) Field of Classification Search
  CPC .......................... B60N 3/108; A47G 23/0216
  See application file for complete search history.

(56) References Cited

U.S. PATENT DOCUMENTS

| 7,354,086 B2 | 4/2008 | Park |
| 7,757,888 B2 | 7/2010 | Ogura |

(Continued)

FOREIGN PATENT DOCUMENTS

| JP | 2010-215073 | 9/2010 |
| JP | 6071003 | 1/2017 |

OTHER PUBLICATIONS

Japanese Office Action dated Jul. 26, 2022, 4 pages, English text.

*Primary Examiner* — Anita M King
(74) *Attorney, Agent, or Firm* — Rankin, Hill & Clark LLP

(57) ABSTRACT

A beverage container holding device includes a housing member for housing a beverage container, a movable floor attached to the housing member for supporting a beverage container bottom, a movable floor biasing member for upwardly biasing the movable floor, and a movable floor locking mechanism for securing the movable floor at a predetermined height against the movable floor biasing member. The housing member has a guide groove, and the movable floor has a branch portion extending through the guide groove to an outside of the housing member, and a claw portion extending horizontally from the branch portion. The movable floor locking mechanism includes an annular member which is rotatably mounted below a bottom member, at least one column member extending upward from the annular member in parallel to the guide groove, and a lock piece integrally formed on each column member for suppressing an upper surface of the claw portion.

5 Claims, 8 Drawing Sheets

(56) References Cited

U.S. PATENT DOCUMENTS

| | | | |
|---|---|---|---|
| 7,828,171 B2 * | 11/2010 | Ogura | B60N 3/102 |
| | | | 220/737 |
| 9,221,581 B2 | 12/2015 | Yokota | |
| 10,086,736 B1 | 10/2018 | Jacobsen | |
| 10,099,594 B2 | 10/2018 | Salinas | |
| 10,506,890 B2 | 12/2019 | Sawada | |
| 10,596,947 B2 | 3/2020 | Smithson | |
| 10,640,028 B2 | 5/2020 | Koarai | |
| 10,894,496 B2 | 1/2021 | Sukumar | |
| 11,180,065 B2 | 11/2021 | Murakami | |
| 2004/0262481 A1 | 12/2004 | Carnevali | |
| 2005/0269472 A1 | 12/2005 | Wagner | |
| 2013/0105536 A1 * | 5/2013 | Simon | B60N 3/102 |
| | | | 224/567 |
| 2014/0299612 A1 | 10/2014 | Brinas | |
| 2018/0029514 A1 * | 2/2018 | Salinas | B60N 3/105 |
| 2019/0111824 A1 | 4/2019 | Koarai | |

* cited by examiner

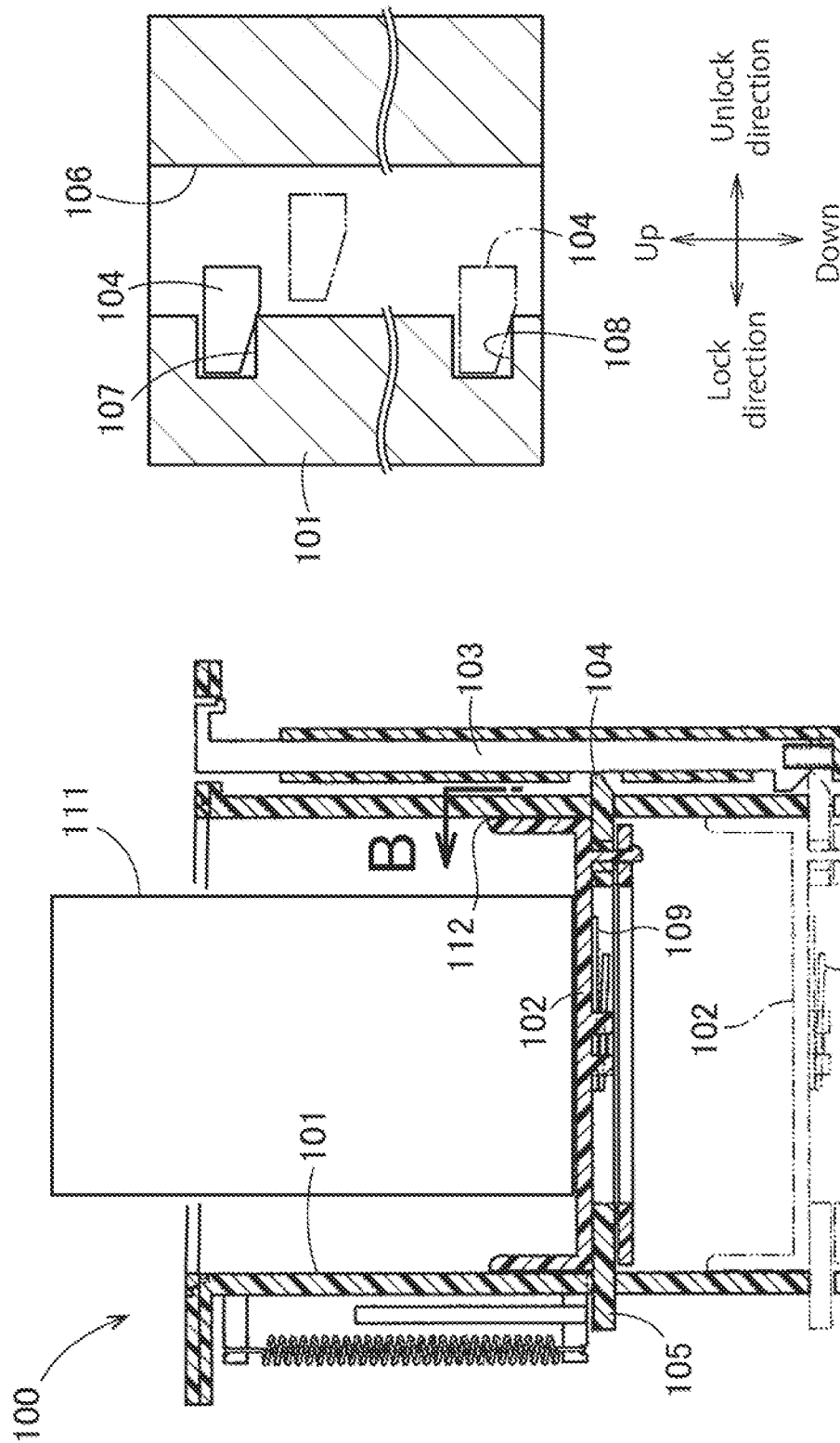

BEVERAGE CONTAINER HOLDING DEVICE

CROSS-REFERENCE TO RELATED APPLICATION

The present application is a divisional of U.S. application Ser. No. 17/226,449 filed on Apr. 9, 2021, which is a divisional of U.S. Ser. No. 16/985,569 filed on Aug. 5, 2020, which claims priority to JP 2019-0149893 filed on Aug. 19, 2019, the disclosures of which are expressly incorporated herein in their entirety.

FIELD OF THE INVENTION

The present invention relates to a beverage container holding device, which is also referred to as a cup holder.

BACKGROUND OF THE INVENTION

In a vehicle, especially a passenger car, a cup holder is provided within the reach of a person in the car. For example, when a beverage container of 350 milli-litre (hereinafter, referred to as ml) is used as a regular size container, a beverage container of 500 ml is used as a long size container, and the cup holder has a depth corresponding to the regular size container, then the long size container protrudes largely upward from the cup holder and becomes unstable. Further, if the depth of the cup holder corresponds to the long size container, the regular size container is difficult to take out from the cup holder.

Accordingly, a cup holder capable of coping with beverage containers having different sizes is known as disclosed in, for example, Japanese Patent No. 6071003.

The technique disclosed in Japanese Patent No. 6071003 will be described with reference to FIG. 8A and FIG. 8B.

FIG. 8A is a cross-sectional view of a conventional beverage container holding device, and FIG. 8B is a drawing when viewed in the direction of the arrow B-B in FIG. 8A.

As shown in FIG. 8A, a beverage container holding device 100 includes, as its major components, a cylindrical portion 101, a movable floor (bed) 102 that moves up and down in the cylindrical portion 101, and an operation rod 103 operated by a person in a vehicle.

On a lower surface of the movable floor 102, a pawl ring 105 is rotatably mounted. A claw 104 is provided on the claw ring 105.

As shown in FIG. 8B, a guide groove 106 extending vertically is formed in the cylindrical portion 101. The claw 104 moves up and down along the guide groove 106.

Lock recesses 107 and 108 are formed on one side of the guide groove 106. When the claw 104 fits in one of the lock recesses 107 and 108, the movable floor 102 is locked and becomes unable to move up and down.

In FIG. 8A, when the moveable floor 102 is in the position indicated by the imaginary line and the operation rod 103 is intentionally depressed, the pawl ring 105 rotates in the unlocking direction against a biasing force of a torsion spring 109. Then, in FIG. 8B, the claw 104 fitted in the lock recess 108 is disengaged, moves up in the guide groove 106, and fits into the lock recess 107 so that the claw 104 reaches a position indicated by a solid line in FIG. 8A.

When a beverage container 111 is intentionally lowered, the movable floor 102, shown in the solid line, is lowered to a position indicated by the imaginary line and locked at that position.

Incidentally, since the beverage container holding device 100 is mounted in a passenger car, the beverage container holding device 100 is affected by vibrations of a vehicle body. Accordingly, some liquid beverage spills from the beverage container 111 at a certain frequency or probability. In addition, when the beverage container 111 is put in and taken out from the beverage container, some liquid beverage may accidentally spill. As the amount of spill increases, the liquid beverage spills from the edge of the moveable floor 102 and flows down through a gap 112 between the cylindrical portion 101 and the moveable floor 102.

A portion of the descending liquid beverage flows down along the guide groove 106, as shown in FIG. 8B. Many liquid beverages contain sticky sugar. This sugar content is interposed between the locking recess 107 and the claw 104 and between the locking recess 108 and the claw 104, and the sugar content is hardened. As a result, the claw 104 is fixed to the lock recess 107 or the lock recess 108, and it becomes difficult to release the lock.

Further, the remainder of the liquid beverage flowing down through the gap 112 proceeds around the bottom surface of the movable floor 102 and solidifies. Then, the pawl ring 105 is fixed to the movable floor 102. As a result, it becomes more and more difficult to release the lock.

As described above, it cannot be said that the beverage container holding device 100 disclosed in Japanese Patent No. 6071003 is a structure resistant to the spilling of the liquid beverage.

However, as the use of the beverage container holding device 100 diversifies, there is a need for a beverage container holding device having a structure that is resistant to the spilling of the liquid beverage, that is, a beverage container holding device that is less prone to operational failures such as difficulty in unlocking even if the liquid beverage spills from the beverage container.

SUMMARY OF THE INVENTION

An object of the present invention is to provide a beverage container holding device which is less prone to operational failures even if liquid beverage spills from a beverage container.

According to a first embodiment of the present invention, there is provided a beverage container holding device including a housing member having an upper opening and a lower opening and configured to house a beverage container inserted from the upper opening, a movable floor attached to the housing member such that the movable floor can move up and down and supports a bottom of the beverage container, a movable floor biasing member spanning the housing member and the movable floor and configured to bias the movable floor upward, a movable floor locking mechanism configured to keep the movable floor at a predetermined height against the movable floor biasing member, an unlocking member configured to release a lock of the movable floor locking mechanism, and a bottom member configured to close the lower opening, the housing member has a guide groove extending vertically, the movable floor has a branch portion extending through the guide groove to an outside of the housing member, and a claw portion extending horizontally from the branch portion, the movable floor locking mechanism includes an annular member which is rotatably mounted below the bottom member, at least one column member extending upward from the annular member in parallel to the guide groove, and a lock piece integrally formed on each column member and configured to suppress an upper surface of the claw portion, and the claw portion and the movable floor locking mechanism are engaged with each other at a position invisible through the guide groove when viewed from a center of the housing member.

In the present invention, when viewed from the center of the housing member, the claw portion and the movable floor locking mechanism are engaged with each other at a position invisible through the guide groove.

A portion of the spilled liquid beverage exits the housing member through the guide groove. Since the engaging portion between the claw portion and the movable floor locking mechanism is in a position not visible through the guide groove, the liquid beverage does not reach the engaging portion. Appropriate engaging and disengaging between the claw portion and the movable floor locking mechanism is maintained.

Therefore, according to the present invention, there is provided a beverage container holding device in which, even if the liquid beverage spills from the beverage container, an operation failure hardly occurs.

Preferably, the movable floor locking mechanism is held by the housing member with an arcuate elongated hole (or holes) and a pin (or pins) fitted in the arcuate elongated hole(s).

Since the movable floor locking mechanism is held by the housing member, the sway of the movable floor locking mechanism (undesired movements in the horizontal direction) is suppressed.

Preferably, upper ends of the column members are connected by a connecting member.

If the upper ends of the column members are free ends, the upper ends are easily deflected.

In the present invention, since the upper ends are connected by the connecting member, it is possible to suppress the deflection of the upper ends of the column members.

Preferably, the bottom member includes a vertical trough continuous to the guide groove.

The liquid beverage flowing down along the guide groove flows down the down pipe portion. The liquid beverage does not flow around to a lower surface (underside) of the bottom member.

Preferably, the bottom member has a drain tubular member, the movable floor locking mechanism is rotatably supported by a locking mechanism support member, and the drain tubular member extends to below the locking mechanism support member.

The drain tubular member can quickly discharge the liquid beverage accumulated on the bottom member. Further, since the drain tubular member extends to below the locking mechanism support member, it is further ensured that no liquid beverage flows around the locking mechanism support member.

Preferably, the drain tubular member has an engaging piece formed thereon, and the engaging piece engages with the locking mechanism support member.

Since the locking mechanism support member is supported by the engaging piece, the swinging of the locking mechanism support member is suppressed. Further, since the locking mechanism support member is temporarily fixed by the engaging piece, an screwing operation is facilitated.

BRIEF DESCRIPTION OF THE DRAWINGS

A plurality of preferred embodiments of the present invention will now be described in detail on the basis of the accompanying drawings, in which:

FIG. 8A shows a cross-sectional view of a conventional beverage container holding device, and FIG. 8B is a drawing when viewed in the direction of the arrow B-B in FIG. 8A.

DETAILED DESCRIPTION OF THE PREFERRED EMBODIMENTS

Embodiments of the present invention will be described below with reference to the accompanying drawings.

Figure 1:
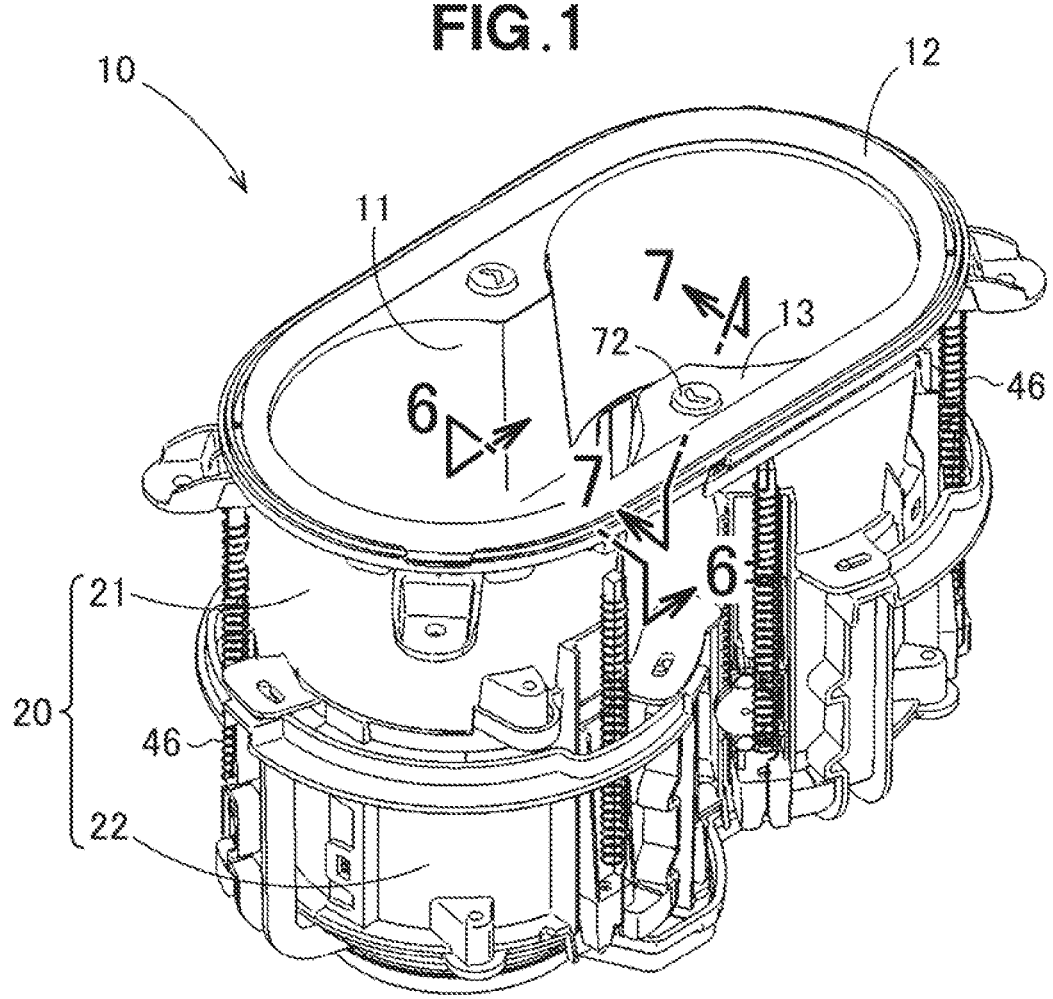
FIG. 1 is a perspective view of a beverage container holding device according to an embodiment of the present invention.
Figure 5:
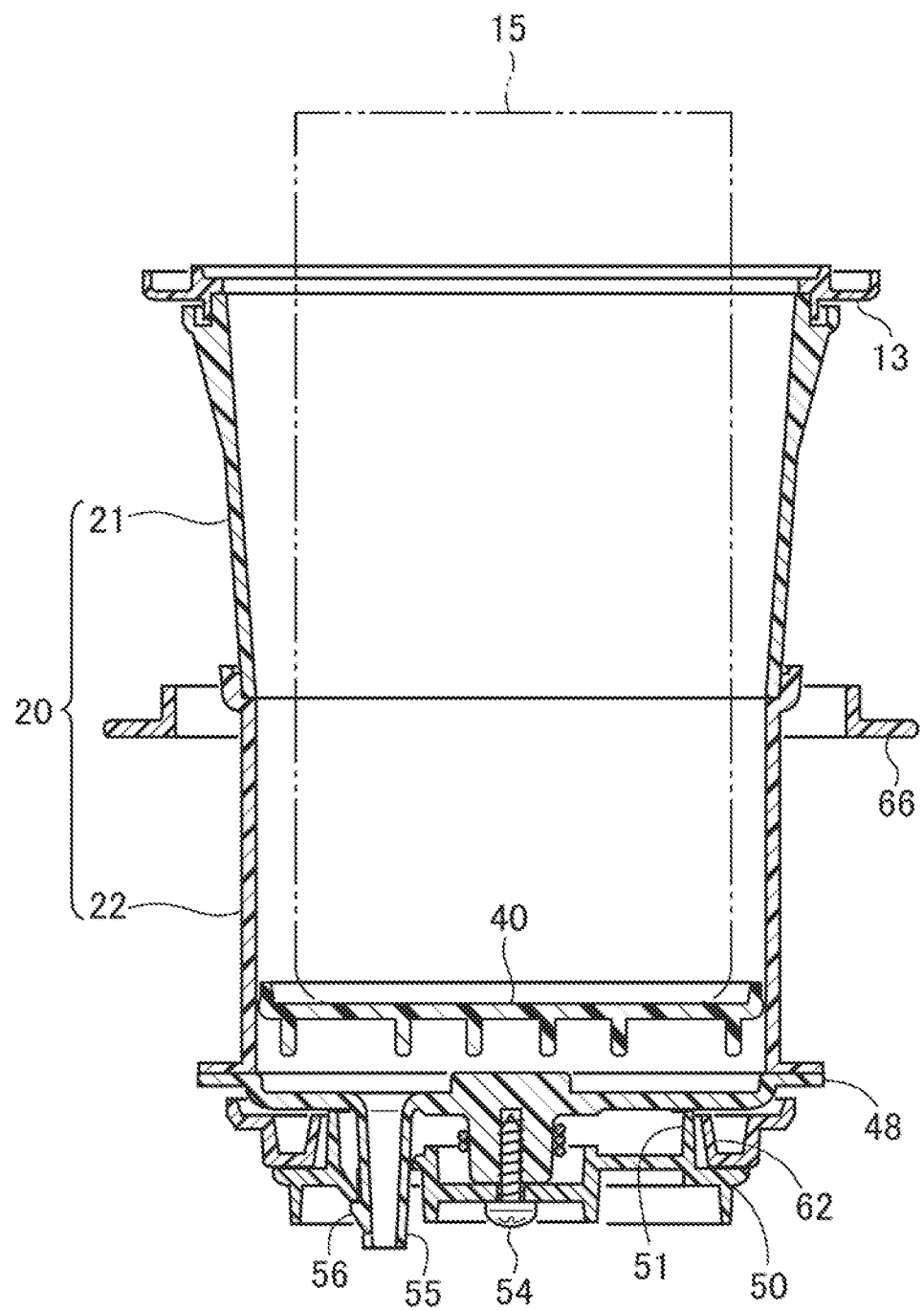
FIG. 5 is a cross-sectional view of the beverage container holding device.

As shown in FIG. 1, a beverage container holding device 10 is a cup holder that has an upper opening 11 in a gourd shape at the top, and through the upper opening 11 it is possible to bring in and out two cylindrical beverage containers (FIG. 5, reference numeral 15). Incidentally, the beverage container holding device 10 according to the embodiment of the present invention may be a cup holder for holding a single beverage container. In this case, the upper opening 11 is a circular opening.

The cylindrical beverage container (FIG. 5, reference numeral 15) may be square (or rectangular) cylinder-shaped. In this case, the upper opening becomes a square gourd shape such that two square openings are connected to each other by a narrow connecting part. Incidentally, the square cylindrical beverage container holding device 10 may be a cup holder for holding a single beverage container. In this case, the upper opening 11 is a square (or rectangular) opening.

A decorative ring 12 is fitted so as to surround the upper opening 11, and an upper panel 13 is placed below the decorative ring 12. An unlocking button 72, i.e., an unlocking member, is disposed on the upper panel 13. The operation of the unlocking button 72 will be described later with reference to FIG. 7.

The structure of each part and component will be described below with reference to FIG. 2 to FIG. 7.

Figure 2:
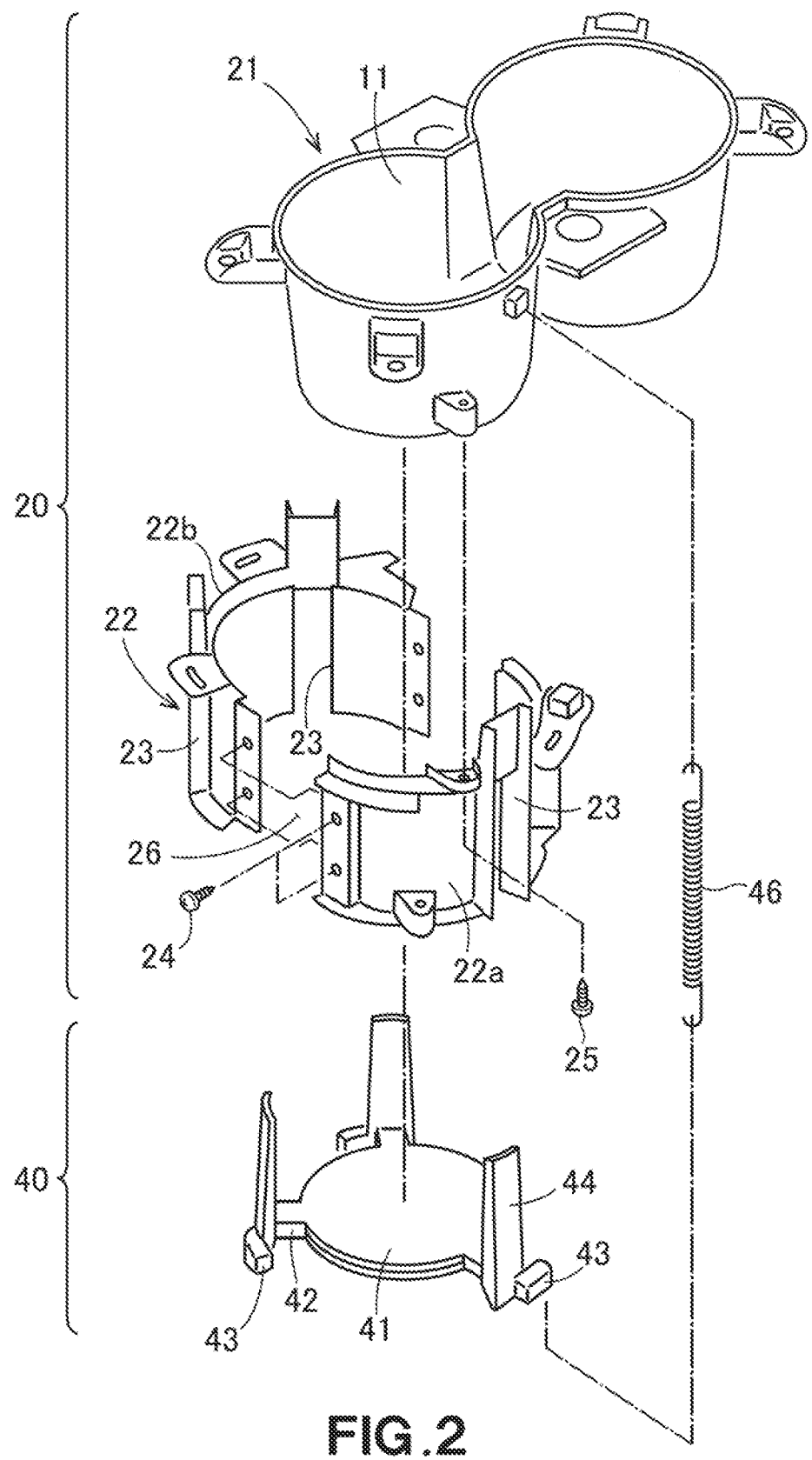
FIG. 2 is an exploded view of the beverage container holding device (upper components)

As shown in FIG. 2, a housing member 20 includes an upper cylindrical body 21 and a lower cylindrical body 22.

In this embodiment, the lower cylindrical body 22 is a two-piece molded body that has a half 22a and another half 22b. More specifically, the half 22b is combined with the half 22a, and the two halves 22a and 22b are coupled with each other by first screws 24 such that the two halves become a single cylinder. Incidentally, the half 22a and the half 22b may be coupled by a claw and a hole. Alternatively, the lower cylindrical body 22 may be a one-piece cylindrical body which is not splittable.

The lower cylindrical body 22 has three guide grooves 23 extending vertically.

The lower cylindrical body 22 is aligned with the upper cylindrical body 21, and the two bodies 21 and 22 are coupled with each other by second screws 25. Thus, the housing member 20 having the upper opening 11 and a lower opening 26 is obtained.

A movable floor 40 is housed in the housing member 20 such that the movable floor 40 can move up and down (vertically).

The movable floor 40 includes a disk portion 41, branch portions 42 extending horizontally outward from the disk portion 41, claw portions 43 extending from the branch portions 42, respectively, and vertically elongated mask portions 44 extending upward from the branch portions 42, respectively. The claw portions 43 extend substantially parallel to the outer edge of the disk portion 41, respectively.

A tension spring, which serves as a movable floor biasing member 46, is stretched between the movable floor 40 and the upper cylindrical body 21 (the biasing member spans the movable floor 40 and the upper cylindrical body 21), That is, in a state where the branch portions 42 reach the upper ends of the guide grooves 23, the movable floor 40 is biased (urged) upward.

Incidentally, the movable floor biasing member 46 is not limited to the tension spring, and it may be a rubber string, a torsion spring or a compression spring. In short, any suitable member may be used as long as it biases the movable floor 40 upward.

Also, the number and locations of the guide grooves 23 are optional, the number and locations of the branch portions 42 are optional, and the number and locations of the movable floor biasing members 46 are optional.

Figure 3:
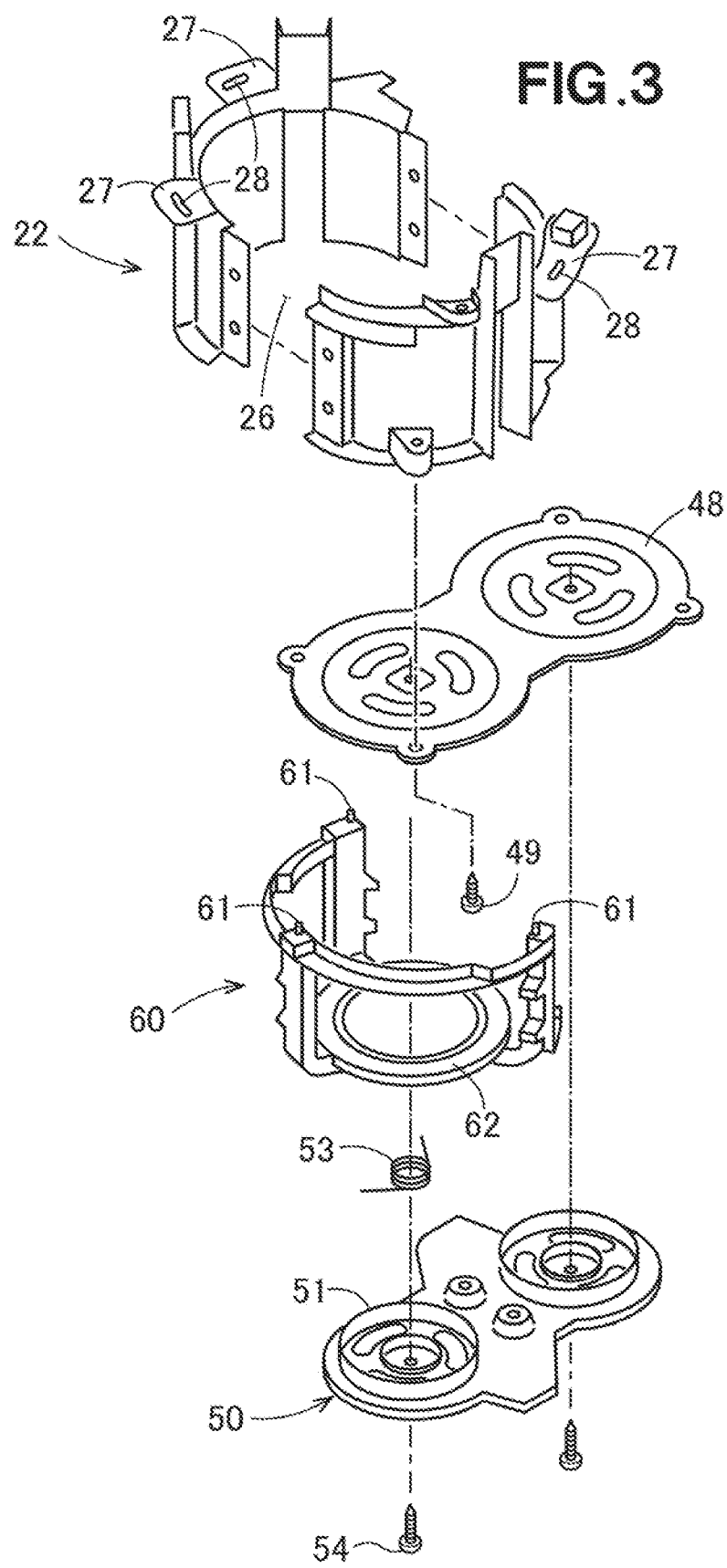
FIG. 3 is another exploded view of the beverage container holding device (lower components)

As shown in FIG. 3, the lower opening 26 of the lower cylindrical body 22 is closed by a bottom member 48. The bottom member 48 is coupled to the lower cylindrical body 22 by third screws 49.

Further, the lower cylindrical body 22 has protruding pieces 27 protruding outward from the upper edge of the lower cylindrical body. The lower cylindrical body 22 also has arcuate elongated holes 28 in the protruding pieces 27, respectively.

Although a structure of a movable floor locking mechanism 60 will be described in detail with reference to FIG. 4, the movable floor locking mechanism 60 has pins 61 on an upper surface thereof, and an annular member 62 in a lower part thereof.

The movable floor locking mechanism 60 is rotatably supported by a locking mechanism support member 50 which also serves as a cover member. Specifically, an annular peripheral wall portion 51 is provided on the locking mechanism support member 50, and an annular member 62 is rotatably fitted over the peripheral wall portion 51.

The movable floor locking mechanism 60 is biased in the locking direction by a torsion spring 53.

The movable floor locking mechanism 60 is fitted in the lower cylindrical body 22 such that the pins 61 are fitted in the arcuate elongated holes 28, respectively. Then, the locking mechanism support member 50 is coupled to the bottom member 48 by fourth screws 54.

Figure 4A:
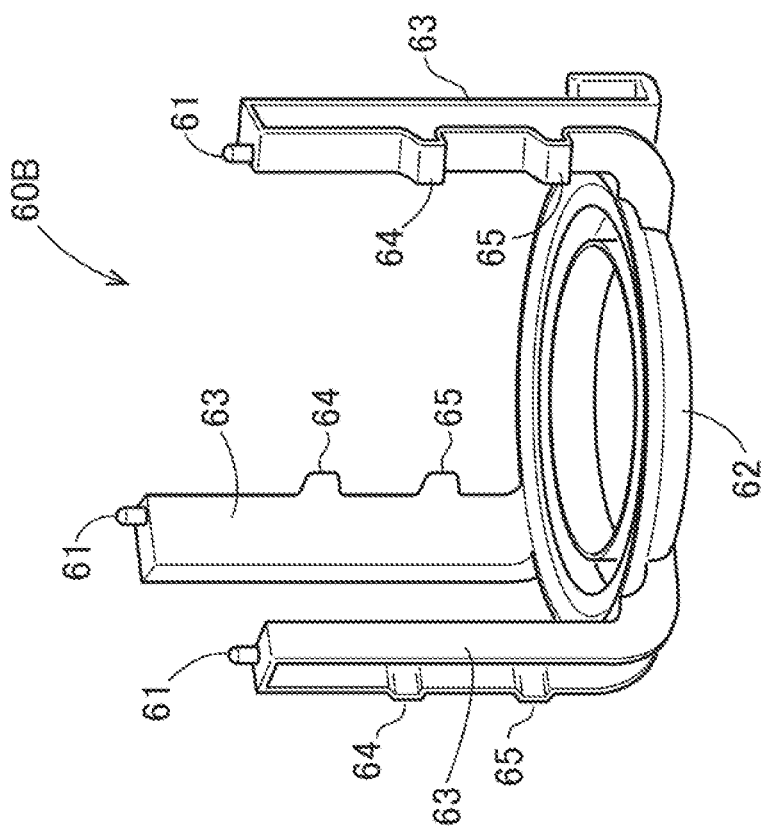
FIG. 4A is a perspective view of a movable floor locking mechanism.

Referring to FIG. 4A, the structure of the movable floor locking mechanism 60 will be described.

As shown in FIG. 4A, the movable floor locking mechanism 60 includes the annular member 62, three column members 63 extending upward from the annular member 62, lock pieces 64 and 65 which are integrally formed on each of the column members 63, a connecting member 66 which connects the upper ends of the column members 63 with each other, and the pins 61 standing from the upper surfaces of the column members 63, respectively.

Incidentally, although the connecting member 66 has a C-shape in this embodiment, the connecting member will have an O shape (annular shape) when the housing member 20 is merely cylindrical.

Further, although the number of the lock pieces 64 and 65 is two in this embodiment, it may be only one, or three or more.

Further, it is possible to reduce the weight by eliminating the connecting member 66 from the movable floor locking mechanism 60. A movable floor locking mechanism 60B without the connecting member 66 will be described with reference to FIG. 4B.

Figure 4B:
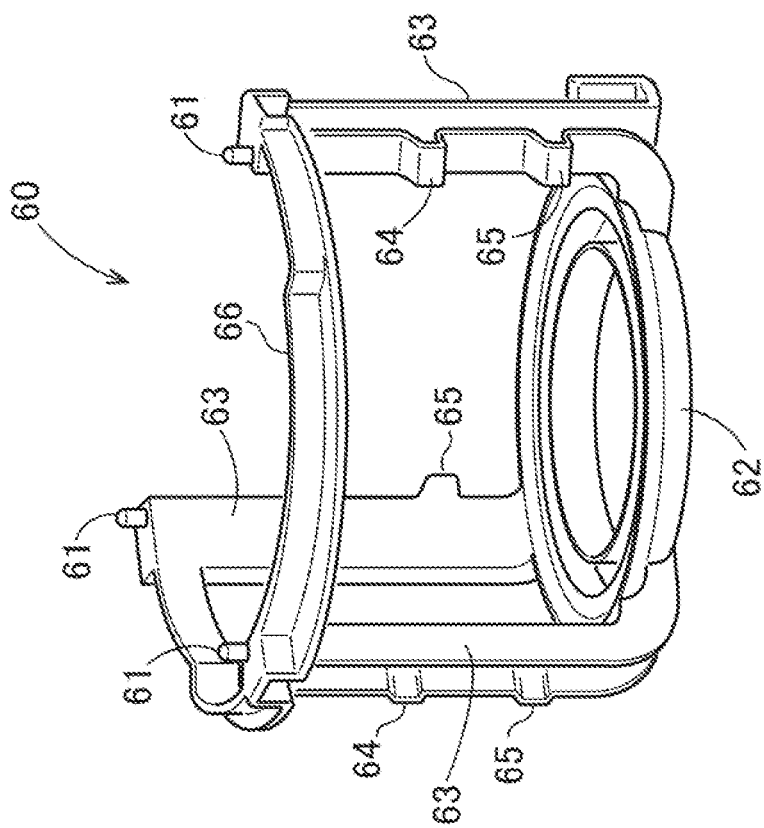
FIG. 4B is a perspective view showing a modification of the movable floor locking mechanism.

That is, as shown in FIG. 4B, the movable floor locking mechanism 60B includes an annular member 62, column members 63 extending upward from the annular member 62, lock pieces 64 and 65 integrally formed on the column members 63, and pins 61 standing from the upper surfaces of the column members 63, respectively.

The weight of the movable floor locking mechanism 60B is reduced by an amount corresponding to the connecting member 66. On the other hand, since each of the column members 63 is a cantilever beam, the deflection of the upper end of each column member 63 is likely to increase.

In this regard, if the structure of FIG. 4A is employed, the connecting member 66 suppresses the deflection of the upper ends of the column members 63.

As shown in FIG. 5, the movable floor 40 is housed in the housing member 20 including the upper cylindrical body 21 and the lower cylindrical body 22 such that the movable floor can move up and down. The movable floor 40 supports the bottom of the so-called long size beverage container 15.

The annular member 62 rotates around the peripheral wall portion 51, and the connecting member 66 rotates around the lower cylindrical body 22.

Incidentally, although the housing member 20 is divided vertically in the embodiment (i.e., the housing member 20 has a two-piece structure), the housing member 20 may be a single cylinder having a one-piece structure if molding is possible.

Figure 6:
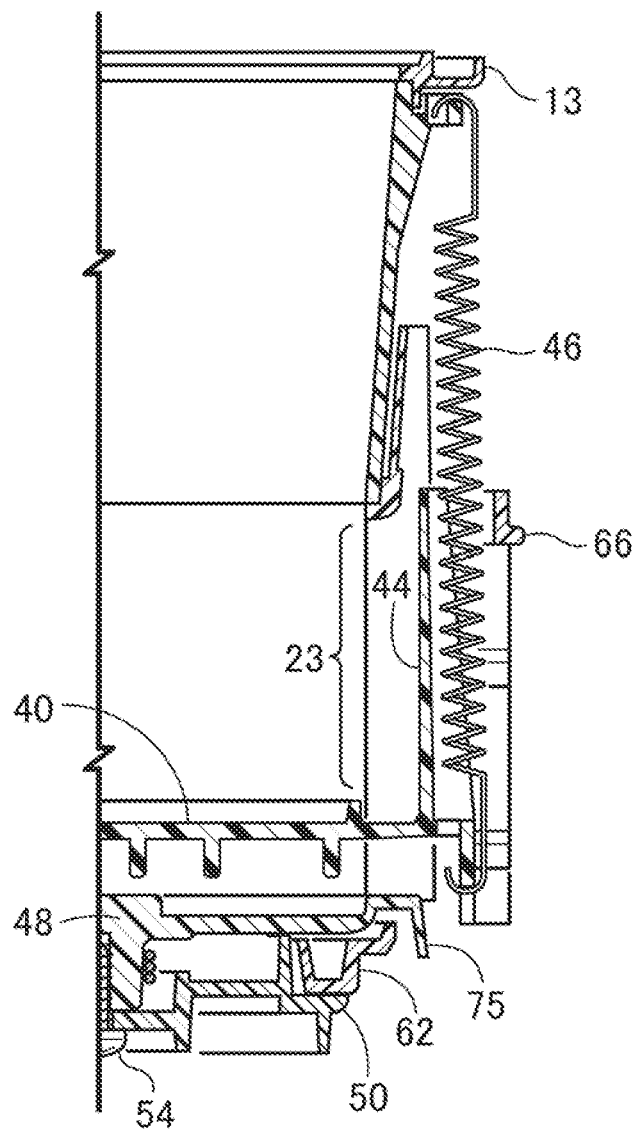
FIG. 6 is a cross-sectional view taken along the line 6-6 in FIG. 1.

As shown in FIG. 6, the movable floor 40 is biased (urged) upwardly by the movable floor biasing member 46. Each of the guide grooves 23 is masked by the associated one of the vertically elongated mask portions 44.

Figure 7:
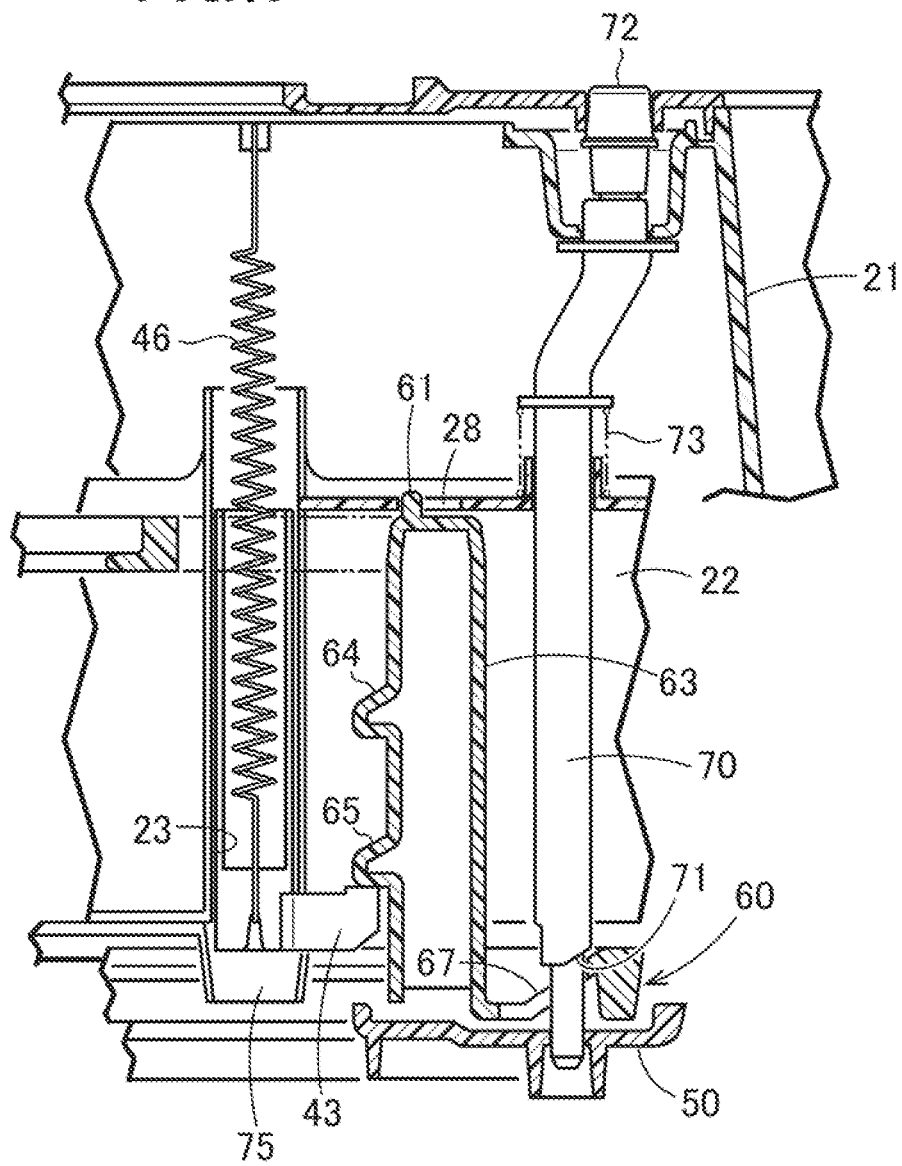
FIG. 7 is a cross-sectional view taken along the line 7-7 in FIG. 1.

As shown in FIG. 7, when viewed from the outside, the claw portions 43 and the movable floor locking mechanism 60 are positioned apart from the guide grooves 23. That is, since a center of the housing member 20 exists behind the drawing sheet (if a reader imagines a three-dimensional structure from FIG. 7), the claw portions 43 and the movable floor locking mechanism 60 are located at a position which cannot be seen from the center of the housing member 20 (when the claw portions 43 and the locking mechanism 60 are looked at from behind the drawing sheet) through the guide grooves 23.

Further, the movable floor locking mechanism 60 has a cam surface 67, which is inclined (inclined upward to the right in the drawing), in the vicinity of one of the column members 63.

In the vicinity of the cam surface 67, disposed is a release rod 70 that extends upward.

The release rod 70 has a cam portion 71, which rests on the cam surface 67, at a lower part of the release rod 70. The lower end of the release rod 70 is supported by the locking mechanism support member 50 such that the lower end of the release rod 70 can move up and down.

Further, the upper portion of the release rod 70 is supported by the upper cylindrical body 21 such that the upper portion of the release rod 70 can move up and down. The unlocking button 72 is fitted over the upper end of the release rod 70 and is biased upward by a biasing member 73 such as a compression spring.

The unlocking member (lock release member) 72 is not limited to the unlocking button 72, and it may be the release rod 70 itself.

As the unlocking button 72 is intentionally depressed, the cam surface 67 is pushed by the cam portion 71, and the movable floor locking mechanism 60 moves in the unlocking direction (to the right in the drawing).

Incidentally, the unlocking button 72 may be provided on the side wall of the upper cylindrical body 21. Although the unlocking button 72 moves horizontally, a mechanism using a link or the like may be provided for converting the horizontal motion to the vertical motion.

In the drawing (FIG. 7), the claw portion 43 is engaged with the lower lock piece 65. That is, the lock piece 65 suppresses the upper surface of the claw portion 43. As a result, the movable floor (FIG. 6, reference numeral 40) which is biased upward by the movable floor biasing member 46 is locked at that position.

As the unlocking button 72 is depressed, the movable floor locking mechanism 60 is moved in the unlocking direction (to the right in the drawing), and the lower lock piece 65 is released from the claw portion 43. Then, the movable floor biasing member 46 causes the claw portion 43 to move upward such that the claw portion 43 reaches the upper edge of the guide groove 23. As a result, as shown in FIG. 5, the upper portion of the beverage container 15 protrudes largely, and it becomes easy to grasp the beverage container.

Although not shown in the drawings, when the beverage container 15 is of regular size, the claw portion 43 is hooked on the upper locking piece 64. With such configuration, as the unlocking button 72 is depressed, the claw portion 43 moves upward and reaches the upper edge of the guide groove 23.

Incidentally, the beverage container may be a paper cup (or plastic cup) whose entire top is open. If the beverage container is a cup, a filled liquid beverage is liable to spill. A portion of the spilled liquid beverage flows through the guide grooves 23 from behind the drawing sheet of FIG. 7 toward a reader of the specification. At this time, the claw portions 43 and the lock pieces 64 and 65 are at positions away from the guide grooves 23. As a result, the spilled liquid beverage does not contact the claw portions 43 and the locking pieces 64 and 65.

Then, the spilled liquid beverage flows down the vertical trough 75 connected to the lower end of the guide groove 23.

In FIG. 6, the presence of the vertical trough 75 prevents the spilled liquid beverage from flowing around to the lower surface of the bottom member 48. In addition, since the vertical trough 75 is outside the locking mechanism support member 50 and the annular member 62 of the movable floor locking mechanism, the liquid beverage flowing down the vertical trough 75 does not flow around the locking mechanism support member 50 and the annular member 62.

Incidentally, as shown in FIG. 5, the bottom member 48 has a drain tubular member 55, and therefore it is possible to quickly drain the liquid beverage. Further, since the drain tubular member 55 extends to below the locking mechanism support member 50, it is further ensured that the liquid beverage does not flow around the locking mechanism support member 50 and the annular member 62.

The drain tubular member 55 has an engaging piece 56. The engaging piece 56 engages with the locking mechanism support member 50.

As described above, the locking mechanism support member 50 is coupled to the bottom member 48 by the fourth screws 54. There is a concern that the locking mechanism support member 50 may swing about the fourth screws 54. However, since the engaging piece 56 supports the locking mechanism support member 50, the swinging of the locking mechanism support member 50 is suppressed.

The locking mechanism support member 50 is supported by the engaging piece 56. Next, the fourth screws 54 are screwed to the bottom member 48. That is, since the locking mechanism support member 50 is temporarily fixed by the engaging piece 56, a screwing operation is facilitated. As a result, a work of coupling the locking mechanism support member 50 to the bottom member 48 is facilitated.

Since the sticky liquid beverage does not contact the claw portions 43 and the lock pieces 64 and 65, and does not flow around the locking mechanism support member 50 and the annular member 62, the movement of the movable floor locking mechanism 60 is smooth, and the locking and unlocking movements are smoothly performed.

When the movable floor locking mechanism 60 rotates, the pins 61 are guided by the arcuate elongated holes 28, and therefore the movable floor locking mechanism 60 rotates without rattling. Thus, the good actuation of the movable floor locking mechanism 60 is maintained.

Incidentally, the pins 61 may be provided on the lower cylindrical body 22, and the arcuate elongated holes 28 may be formed in the column members 63. Further, the arcuate elongated holes 28 through which the pins 61 penetrate may be replaced with arcuate grooves in which the pins 61 are fitted.

Further, the shape of each pin 61 is not limited to cylindrical. Each pin 61 may have an arbitrary shape as long as the pin can move in the arcuate elongated hole 28.

Incidentally, the beverage container holding device 10 of the present invention is suitable for a passenger car, but it may be applied to land vehicles such as trucks and buses, and also applied to aircrafts and ships. It should be noted that the beverage container holding device 10 of the present invention is more suitable for a vehicle that is assumed to start suddenly and stop suddenly.

The beverage container holding device of the present invention is advantageously used for a vehicle.

What is claimed is:

1. A beverage container holding device comprising:
   a housing member having an upper opening and a lower opening and configured to house a beverage container inserted from the upper opening;
   a movable floor attached to the housing member such that the movable floor can move up and down and supports a bottom of the beverage container;
   a movable floor biasing member spanning the housing member and the movable floor and configured to bias the movable floor upward;
   a movable floor locking mechanism configured to keep the movable floor at a predetermined height against the movable floor biasing member; and
   a bottom member configured to close the lower opening, the movable floor locking mechanism including an annular member,
   the bottom member comprising a drain tubular member, and
   the drain tubular member extending to below the annular member.

2. The beverage container holding device according to claim 1, wherein the movable floor locking mechanism is rotatably supported by a locking mechanism support member, and the drain tubular member extends to below the locking mechanism support member.

3. The beverage container holding device according to claim 2, wherein the drain tubular member comprises an engaging piece formed thereon, and the engaging piece engages with the locking mechanism support member.

4. A beverage container holding device comprising:
   a housing member having an upper opening and a lower opening and configured to house a beverage container inserted from the upper opening;
   a movable floor attached to the housing member such that the movable floor can move up and down and supports a bottom of the beverage container;
   a movable floor biasing member spanning the housing member and the movable floor and configured to bias the movable floor upward;
   a movable floor locking mechanism configured to keep the movable floor at a predetermined height against the movable floor biasing member; and
   a bottom member configured to close the lower opening, the bottom member comprising a drain tubular member, the movable floor locking mechanism supported by a locking mechanism support member and
   the drain tubular member extending to below the locking mechanism support member.

5. The beverage container holding device according to claim 4, wherein the drain tubular member comprises an engaging piece formed thereon, and the engaging piece engages with the locking mechanism support member.

* * * * *